(12) United States Patent
Ashok et al.

(10) Patent No.: US 11,307,886 B2
(45) Date of Patent: *Apr. 19, 2022

(54) SECURE ACCESS TO A VIRTUAL MACHINE

(71) Applicant: International Business Machines Corporation, Armonk, NY (US)

(72) Inventors: Rohith K. Ashok, Natick, MA (US); Aaron K. Shook, Raleigh, NC (US); Daniel E. Jemiolo, Chapel Hill, NC (US); Todd E. Kaplinger, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 414 days.

This patent is subject to a terminal disclaimer.

(21) Appl. No.: 16/676,206

(22) Filed: Nov. 6, 2019

(65) Prior Publication Data
US 2020/0073696 A1    Mar. 5, 2020

Related U.S. Application Data (63) Continuation of application No. 15/226,582, filed on Aug. 2, 2016, now Pat. No. 10,552,189, which is a
(Continued)

(51) Int. Cl.
*G06F 9/455* (2018.01)
*G06F 21/53* (2013.01)
(Continued)

(52) U.S. Cl.
CPC .......... *G06F 9/45558* (2013.01); *G06F 21/53* (2013.01); *H04L 63/102* (2013.01);
(Continued)

(58) Field of Classification Search
CPC ................. G06F 9/45558; G06F 21/53; G06F 2009/45587; G06F 2009/45595; H04L 63/102

See application file for complete search history.

(56) References Cited

U.S. PATENT DOCUMENTS 7,051,366 B1   5/2006   Lamacchia
7,069,438 B2   6/2006   Balabine
(Continued)

FOREIGN PATENT DOCUMENTS

WO   2009132016 A1   10/2009

OTHER PUBLICATIONS

Owens; "Securing Virtual Compute Infrastructure in the Cloud"; SAVVIS; Jan. 1, 2009.
(Continued)

*Primary Examiner* — Beemnet W Dada
(74) *Attorney, Agent, or Firm* — Fabian VanCott; Steven L. Nichols (57) ABSTRACT

A method for providing secure access to a virtual machine includes dispensing an image corresponding to a virtual machine from a management appliance to a distributed computing system such that the virtual machine is implemented by at least one of a plurality of interconnected physical computing devices in the distributed computing system; establishing a trusted relationship between the management appliance and the virtual machine; and providing a user with access to the virtual machine from the management appliance without further authentication credentials from the user.

17 Claims, 5 Drawing Sheets

Related U.S. Application Data continuation of application No. 12/763,748, filed on Apr. 20, 2010, now Pat. No. 9,443,078.

(51) Int. Cl.
*H04L 9/40* (2022.01)
*H04L 29/06* (2006.01)

(52) U.S. Cl.
CPC .............. *G06F 2009/45587* (2013.01); *G06F 2009/45595* (2013.01)

(56) References Cited

U.S. PATENT DOCUMENTS

| | | | |
|---|---|---|---|
| 7,127,579 B2 | 10/2006 | Zimmer | |
| 7,131,143 B1 | 10/2006 | Lamacchia | |
| 7,213,047 B2 | 5/2007 | Yeager | |
| 7,257,836 B1 | 8/2007 | Moore | |
| 7,340,772 B2 | 3/2008 | Panasyuk | |
| 7,467,370 B2 | 12/2008 | Proudler | |
| 7,552,468 B2 | 6/2009 | Burch | |
| 7,562,382 B2 | 7/2009 | Hinton | |
| 7,631,346 B2 | 12/2009 | Hinton | |
| 7,669,238 B2 | 2/2010 | Fee | |
| 7,676,828 B1 | 3/2010 | DeCaprio | |
| 7,721,328 B2 | 5/2010 | Boulos | |
| 7,734,791 B2 | 6/2010 | Cunningham | |
| 7,793,101 B2 | 9/2010 | Wipfel | |
| 7,954,150 B2 | 5/2011 | Croft | |
| 8,042,162 B2 | 10/2011 | Blakley, III | |
| 8,074,262 B2 | 12/2011 | Scarlata | |
| 8,112,789 B2 | 2/2012 | Halls | |
| 8,191,086 B2 | 5/2012 | Sandland | |
| 8,220,029 B2 * | 7/2012 | Zhang ..................... G06F 21/53 726/1 | |
| 8,230,485 B2 | 7/2012 | Reasor | |
| 8,397,306 B1 * | 3/2013 | Tormasov ............... G06F 21/53 713/166 |
| 9,443,078 B2 * | 9/2016 | Ashok ................ G06F 9/45558 |
| 2004/0148514 A1 | 7/2004 | Fee | |
| 2005/0066198 A1 | 3/2005 | Gelme et al. | |
| 2006/0020939 A1 | 1/2006 | Fellenstein | |
| 2006/0218630 A1 | 9/2006 | Pearson | |
| 2007/0107048 A1 | 5/2007 | Halls | |
| 2007/0180447 A1 | 8/2007 | Mazzaferri | |
| 2007/0180450 A1 | 8/2007 | Croft | |
| 2007/0180493 A1 | 8/2007 | Croft | |
| 2007/0186212 A1 | 8/2007 | Mazzaferri | |
| 2007/0288247 A1 | 12/2007 | Mackay | |
| 2008/0133777 A1 | 6/2008 | Wilkinson | |
| 2008/0263629 A1 | 10/2008 | Anderson | |
| 2008/0301765 A1 | 12/2008 | Nicol | |
| 2008/0320561 A1 | 12/2008 | Suit | |
| 2009/0064292 A1 | 3/2009 | Carter | |
| 2009/0172781 A1 | 7/2009 | Masuoka | |
| 2009/0198997 A1 | 8/2009 | Yeap | |
| 2009/0210934 A1 | 8/2009 | Innes | |
| 2009/0300739 A1 | 12/2009 | Nice | |
| 2009/0328170 A1 | 12/2009 | Williams | |
| 2010/0023996 A1 | 1/2010 | Sabin | |
| 2010/0042846 A1 | 2/2010 | Trotter | |
| 2010/0042988 A1 | 2/2010 | Lundin | |
| 2010/0088699 A1 | 4/2010 | Sasaki | |
| 2011/0107401 A1 | 5/2011 | Bhai | |
| 2011/0119747 A1 | 5/2011 | Lambiase | |
| 2011/0197065 A1 | 8/2011 | Stauth | |
| 2011/0197259 A1 | 8/2011 | Thibadeau | |
| 2011/0214176 A1 | 9/2011 | Burch | |
| 2011/0314532 A1 | 12/2011 | Austin | |
| 2011/0314533 A1 | 12/2011 | Austin | |
| 2012/0005724 A1 | 1/2012 | Lee | |
| 2012/0011578 A1 | 1/2012 | Hinton | |
| 2012/0066752 A1 | 3/2012 | Vysogorets | |
| 2012/0096271 A1 | 4/2012 | Ramarathinam | |
| 2012/0096567 A1 | 4/2012 | Ferris | |
| 2012/0117634 A1 | 5/2012 | Halls | |
| 2012/0180035 A1 | 7/2012 | Poddar | |

OTHER PUBLICATIONS

Wei et al.; "Managing Security of Virtual Machine Images in a Cloud Environment"; Nov. 13, 2009.

List of IBM Patents or Applications Treated as Related; Nov. 6, 2019.

* cited by examiner

SECURE ACCESS TO A VIRTUAL MACHINE

BACKGROUND

Aspects of the present invention relate in general to distributed computing system security, and more particularly to, methods and systems providing trusted and secure access to virtual machine images dispatched to a distributed computing system.

A distributed computing system is a group of autonomous computing systems connected to each other through a network. In such a system, the processing resources of the constituent computing systems may be dynamically scalable and often virtualized. A virtual resource is a piece of software designed to emulate a piece of hardware. The use of virtual resources may increase the efficiency of a distributed computing system, since details relating to the implementation of software applications running on the system and the hardware that supports them may be delegated among the computing systems in the distributed computing system and abstracted to the end user.

In some cases, a virtual machine image may be dispatched to a distributed computing system by a management appliance. Secure access to the dispatched virtual machine from a management appliance generally involves standard security features such as login identification and passwords. It may often become a tedious and time consuming task to manage security for the dispatched virtual machine image. The complexity of such a task is based in part on the movement of the virtual machine across multiple physical machines. Security measures based on the physical location of the virtual machine may become more complicated as they adapt to the characteristics of a virtual machine image dispatched onto a distributed computing system.

BRIEF SUMMARY

A method for providing secure access to a virtual machine includes dispensing an image corresponding to a virtual machine from a management appliance to a distributed computing system such that the virtual machine is implemented by at least one of a plurality of interconnected physical computing devices in the distributed computing system; establishing a trusted relationship between the management appliance and the virtual machine; and providing a user with access to the virtual machine from the management appliance without further authentication credentials from the user.

A management appliance includes at least one processor and a memory communicatively coupled to the at least one processor, the memory including executable code stored thereon such that the at least one processor, upon executing the executable code, is configured to dispense an image corresponding to a virtual machine to a distributed computing system comprising a plurality of interconnected computing devices, such that at least one of the computing devices implements the virtual machine; establish a trusted relationship with the virtual machine; and provide an authenticated user with access to the virtual machine without further authentication credentials from the user.

A computer program product for providing secure access to a virtual machine on a distributed computing system comprising a plurality of interconnected physical computing systems, the computer program product includes a computer readable storage medium having computer readable code embodied therewith. The computer readable program code includes computer readable program code configured to dispense a virtual machine image from a management appliance to the distributed computing system; computer readable program code configured to establish a trusted relationship between the management appliance and the virtual machine image; and computer readable program code configured to provide a user with access to the virtual machine image from the management appliance without further authentication credentials from the user.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification discloses a method and system for automatically establishing a trusted relationship between a management appliance and a virtual machine dispensed from the management appliance. Thus, an authenticated user having access to the management appliance may access the virtual machine without the need for providing further credentials such as a login identification or password.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout the specification and in the appended claims, the term "virtual machine" is to be broadly interpreted as a piece of software configured to emulate physical hardware. A "virtual machine image" is to be broadly interpreted as a copy of the software comprising a virtual machine.

Throughout this specification and in the appended claims, the term "distributed computing system" is to be broadly interpreted as a plurality of physical computing systems interconnected through a network. A distributed computing system may include virtualized resources as well as hardware resources. A distributed computing system may be configured to process various tasks at the request of client and/or management systems.

Throughout this specification and in the appended claims, the term "trusted relationship" is to be broadly interpreted as a relationship between at least two entities such that data transfer and access between the at least two entities is trusted to be secure.

Figure 1:
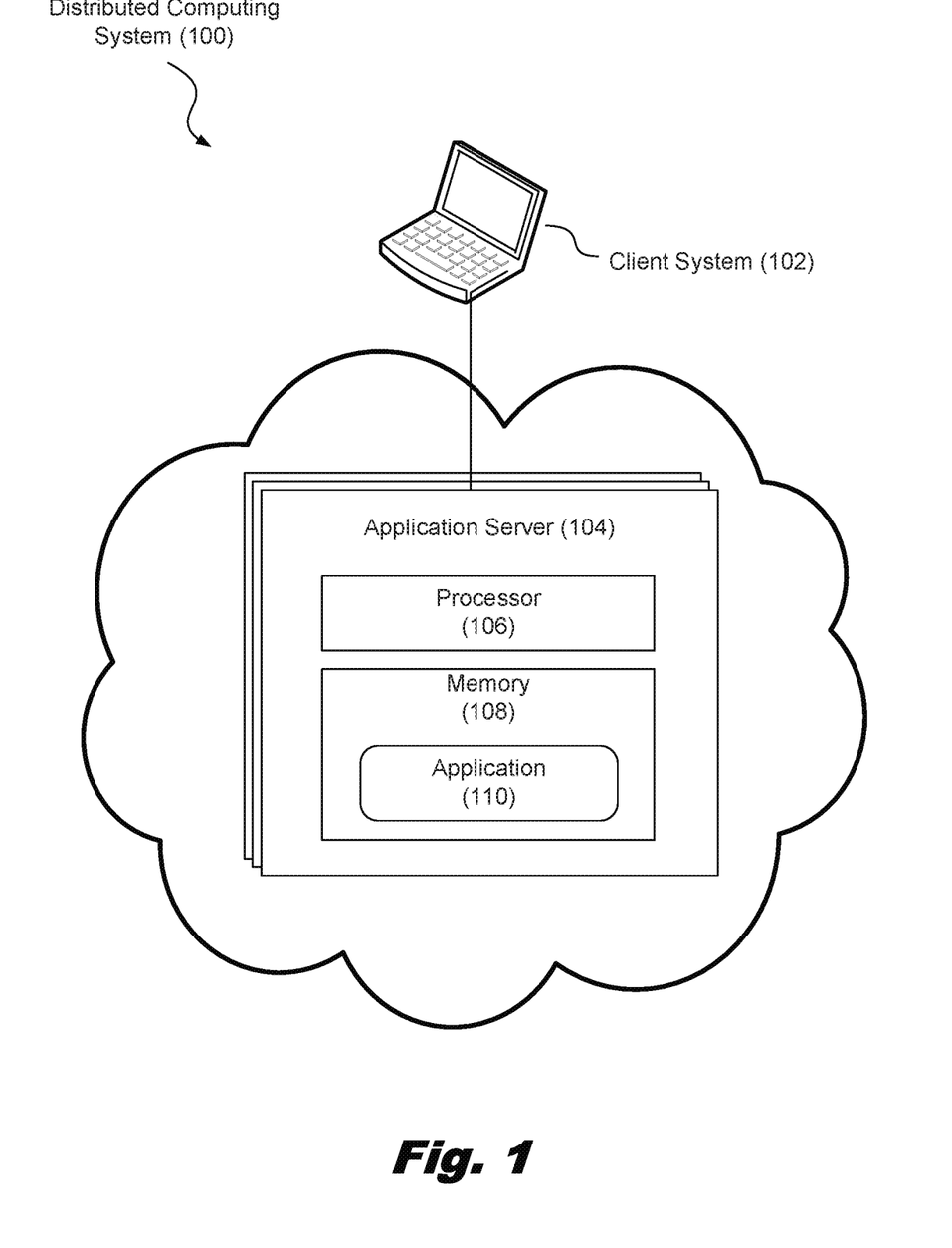
FIG. 1 is a diagram showing an illustrative distributed computing system, according to one embodiment of principles described herein.

Referring now to the figures, FIG. 1 is a diagram showing an illustrative distributed computing system (100). According to certain illustrative embodiments, a distributed computing system (100) may include a number of application servers (104). Each application server may have a processor (106) and a memory (108). A client system (102) connected to the distributed computing system (100) may be able to access software applications (110) stored on one of the application servers (104).

As mentioned above, a distributed computing system (100) is a group of physical computing systems connected over a network which may be used to provide application processing to an end user. The implementation of the hardware performing the processing of the applications is typically abstracted to the user. The implementation of the network structure often allows the distributed computing system to be dynamically scalable. A scalable system is able to increase its capacity without negatively affecting the overall throughput of the system.

Distributed computing systems typically offer business type application processing to a variety of organizations and businesses. Using a distributed computing system instead of putting out the initial capital expenditure for the hardware, software, training and labor costs may save a company a fair amount of money. The company may simply be billed for the processing use of a distributed computing system. In some cases, a business or organization may wish to have their own distributed computing system. This is typically referred to as enterprise cloud computing. An enterprise distributed computing system allows a business to maintain a greater control over their computing systems. Employees of a business or members of an organization may access the enterprise distributed computing system from various terminals connected to the system. An enterprise distributed computing system may also allow an organization to customize their systems to their specialized needs.

An application server (104) is a software framework implemented on a physical computing system which is designed to process scripts, routines, and programs involved with the construction of software applications (110). An application server (104) may make its resources available through an Application Programming Interface (API). The API may indicate how various resources are to be called. The physical computing system running the application server may also run other types of servers such as database management servers and storage servers.

A typical physical computing system such as a server generally includes a form of memory (108). There are many types of memory available. Some types of memory, such as hard disk drives, optical disc drives, and solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of data and software. Software is a set of data in the form of instructions which are to be executed by a processor (106).

An application server (104) may be configured to respond to requests from a client system (102). A client system may have a web browser installed thereon allowing a user to access a web application (110) from an application server (104). In some cases, a client system (102) may have a piece of software installed thereon which is configured to request resources from an application server (104).

Figure 2:
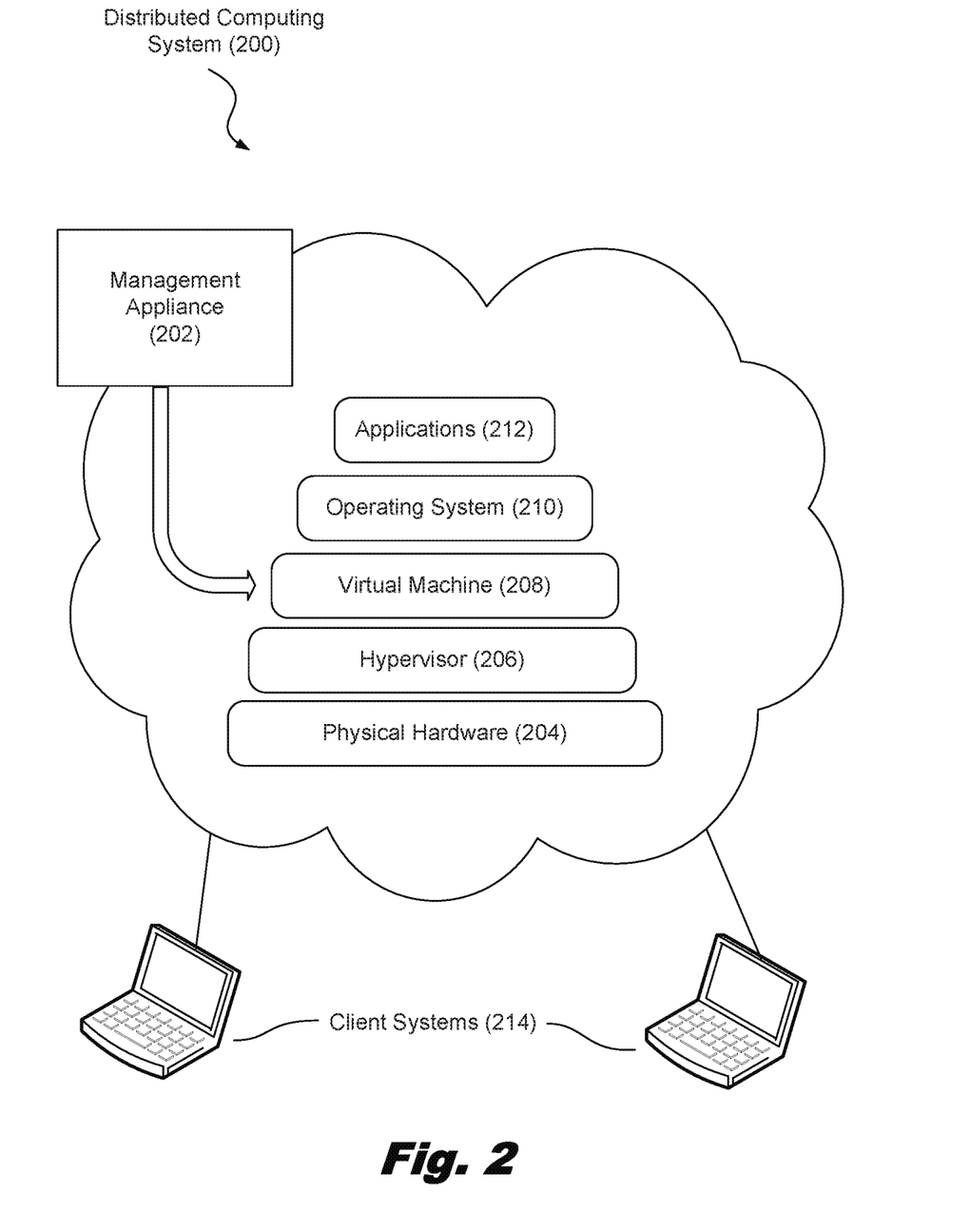
FIG. 2 is a diagram showing an illustrative distributed computing system employing virtualization, according to one embodiment of principles described herein.

FIG. 2 is a diagram showing an illustrative distributed computing system (200) employing virtualization. According to certain illustrative embodiments, a distributed computing system may include physical hardware (204) running a hypervisor (206). The hypervisor (206) may support a number of virtual machines (208). Each virtual machine may have its own operating system (210) and applications (212) running thereon. Various client systems (214) connected to the distributed computing system (200) may be able to receive services from the virtual machine (208).

The physical electronic components of a computing device are referred to as the system's physical hardware (204). Physical hardware (204) often includes, among other things, a processor, memory, and a variety of interface components. The processor is designed to execute instructions in the form of machine code. Some of these instructions may reside in non-volatile memory while no power is being supplied to the hardware (204). When the power is first turned on to a physical computing device, various sets of instructions are loaded from the non-volatile memory into the main memory. These sets of instructions may form an operating system which in turn may run various software programs.

An operating system is an interface between the physical hardware and various computer programs configured to run on a physical computing system. One function of an operating system is to handle the details involved with operating the system's hardware (204) and other available resources. One type of program an operating system may be configured to run is a hypervisor (206).

A hypervisor (206) is a virtual machine monitor program. A hypervisor (206) may allow multiple virtual machines (208) to operate on the same hardware (204), each virtual machine (208) having its own operating systems (210). A virtual machine (208) is a software program that emulates physical hardware. Thus an operating system (210) running on a virtual machine (208) behaves as though it is referencing hardware directly while in actuality it is interacting with the virtual machine software. The virtual machine (208) then uses the hypervisor (206) to utilize the physical hardware (208) to perform whatever tasks may be needed.

Virtual machines (208) may provide many advantages. One advantage of virtual machines (208) is that they allow software to be designed for a specific operating system (210) or a specific instruction set architecture and yet still run on a variety of physical hardware types. This is possible because a wide variety of different hardware types may run the same type of virtual machine (208), allowing the hardware specific or operating system (210) specific software to run on the different hardware types.

As mentioned above, an operating system (210) is generally used to run applications (212), Applications (212) include a set of instructions which cause a processor to perform various useful functions for a user. Some examples of applications (212) are web-browsers, email clients, and word processors. These applications (212) are generally written for specific operating systems (210). In this way, the applications (212) do not need to deal with the details of hardware (204) operation directly. Rather, the applications (212) interact directly with the operating system (210) which in turn handles the details of operating the system hardware or virtual hardware.

In a distributed computing system, the processing of various applications (212) may be performed in response to a request from a client system (214) connected to the distributed computing systems. Thus, a client system (214) may require only a minimal amount of processing power as the bulk of the processing requirements are performed by some resource within the distributed computing system. This type of system may be beneficial for larger entities having a large number of personnel. Instead of issuing each person a high powered processor computing system, each person may be issued a less expensive and less powerful computing system which may outsource its processing requirements to a distributed computing system (200).

In some embodiments, a distributed computing system (200) is managed by a type of management appliance (202). The management appliance (202) may be a physical computing system such as a server connected to the distributed computing system (200). The management appliance (202) may be responsible for dispensing virtual machine images to the distributed computing system. A virtual machine image is an instantiation of a particular virtual machine (208). Multiple images of a virtual machine (208) may be dispensed to the distributed computing system (200). System administrators may login to the management appliance (202) either directly or remotely and perform administrative tasks therefrom.

Some of the administrative tasks performed by an administrator may involve accessing a virtual machine (208) that has been dispensed from the management appliance (202). For security purposes, access to a virtual machine (208) dispatched to the distributed computing system (200) may be only allowed from the management appliance (202) that dispatched it. A user who has successfully logged in to the management appliance (202) may, in turn, log into the virtual machine (208) by providing appropriate credentials. This additional step of providing further credentials may not only be inconvenient to the user, but it may also place the virtual machine at risk of cyber attack. For example, some virtual systems may be compromised by persons having malicious intent. Such persons may intercept login credentials and access the virtual machine themselves. Such intrusion may make the virtual machine susceptible to many kinds of cyber attacks.

To mitigate the risk of such an attack and to provide convenience to a user such as a system administrator, the applicant has discovered systems and methods for providing secure access form a management appliance to a dispensed virtual machine. This may be done by automatically establishing a trusted relationship between the management appliance and the virtual machine.

Figure 3:
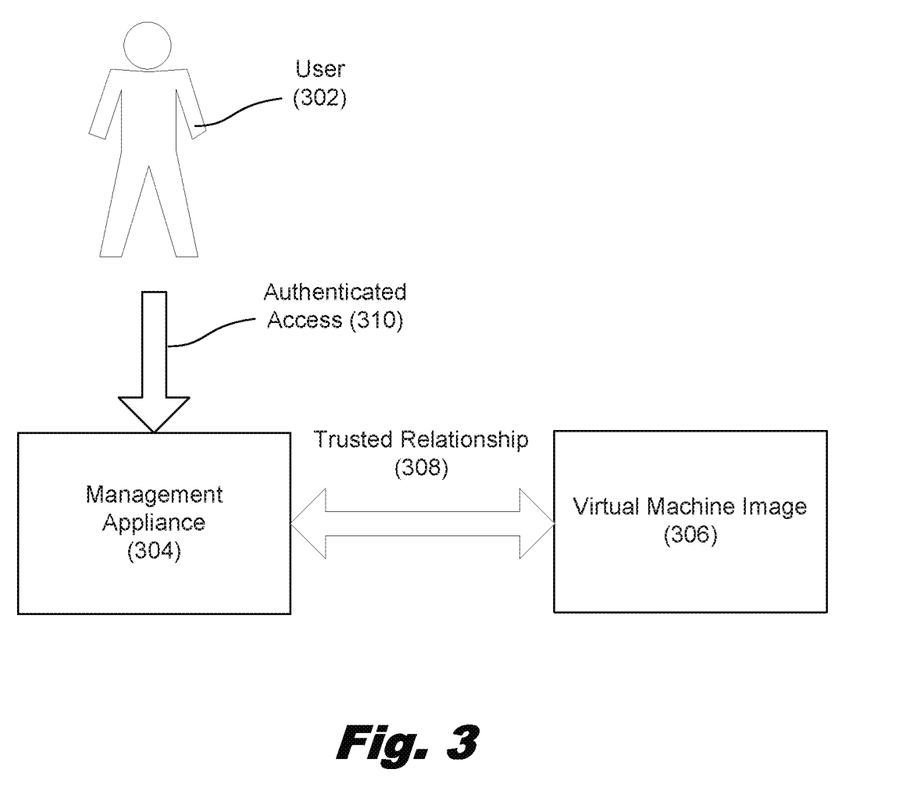
FIG. 3 is a diagram showing an illustrative process of establishing a trusted relationship between a management appliance and a virtual machine, according to one embodiment of principles described herein.

FIG. 3 is a diagram showing an illustrative process of establishing a trusted relationship between a management appliance and a virtual machine. According to certain illustrative embodiments a management appliance (304) may dispense a virtual machine image (306) to a distributed computing system. A trusted relationship (308) may then be established between the management appliance (304) and the virtual machine (306). Thus, a user (302) having authenticated access (310) to the management appliance (304) may access the virtual machine (306) therefrom.

According to certain illustrative embodiments, a virtual machine image may be dispensed from a management appliance (304). This dispensing of the virtual machine image may happen automatically or in response to a user (302) command. After the virtual machine image has been dispensed, a trusted relationship (308) may be established between the management appliance (304) and the virtual machine (306). This trusted relationship may be established through a variety of means including, but not limited to, public key cryptography. In some embodiments, the trusted relationship (308) may be established immediately after the virtual machine (306) has been dispensed. In some embodiments, the trusted relationship may be established at a later time, such as in response to a user (302) attempting to gain access to the virtual machine (306) from the management appliance (304). In some embodiments, the trusted relationship may be set to expire after a predetermined amount of time. This may provide additional security by requiring a new trusted relationship to be established on a regular basis.

A user (302) may gain access to a management appliance (304) through a variety of means including, but not limited to, a web browser. Upon access to a management appliance (304), a user is typically required to enter a set of credentials such as a login identification and password. The users who are given access to the management appliance (304) may be determined by a system administrator and set up appropriately. Each user may have different levels of access to the management appliance (304). From the management appliance, an authenticated user may access the dispensed virtual machine (306) using a variety of protocols including, but not limited to Secure Shell (SSH) or File Transfer Protocol (FTP). With the trusted relationship already established, the user will not need to enter any more credentials. The virtual machine (306) may assume that because access is being requested from a trusted entity, no further authentication is necessary.

In some embodiments, the management appliance (304) may be configured to filter requests for access to the virtual machine based on the access privileges of the current user. For example, if a user who has access to the management appliance and not the virtual machine (306) attempts to access the virtual machine (306). The management appliance (304) may catch the request before it goes through the SSH or FTP protocol. Doing so may reduce unnecessary network traffic.

As mentioned above, a trusted relationship may be established through a variety of means. Despite the mechanism for establishing a trusted relationship, one important aspect of the trusted relationship is that one party must have an unambiguous identification of the other party. This may be done through a variety of means. One such mean is public key cryptography.

Figure 4A:
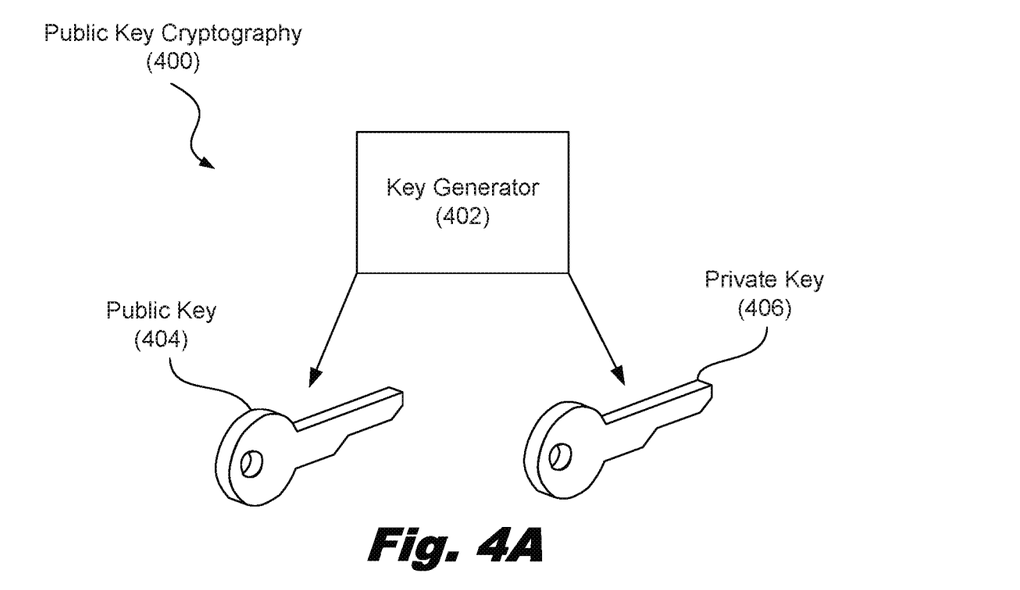
FIGS. 4A and 4B are diagrams showing illustrative public key cryptography principles, according to one embodiment of principles described herein.
Figure 4B:
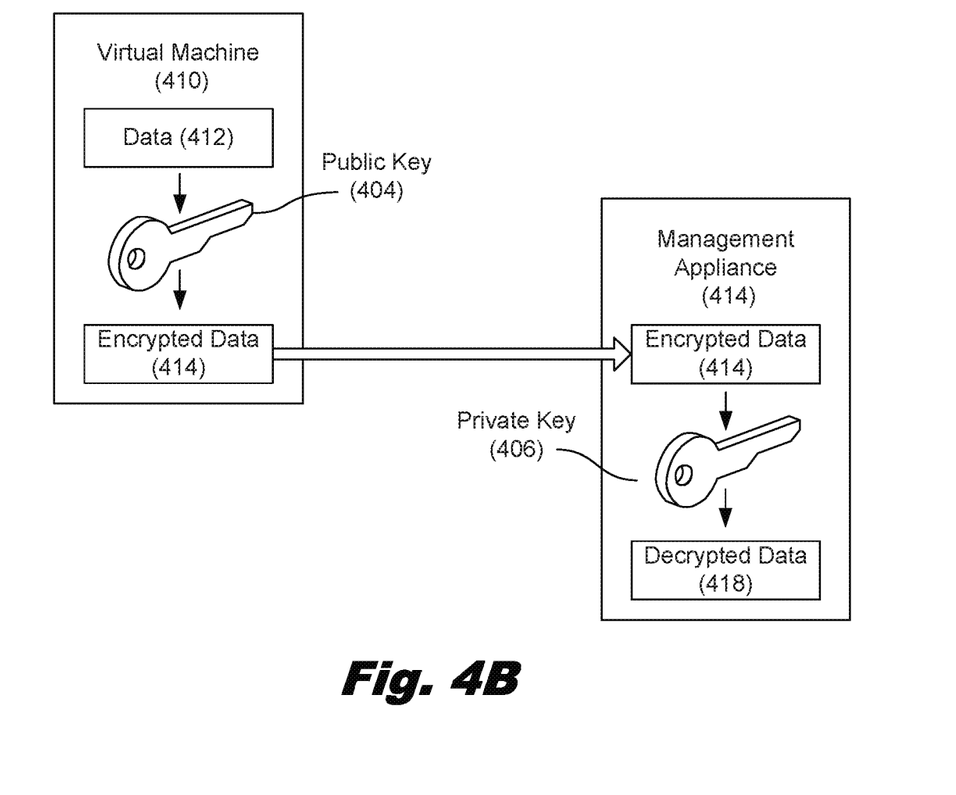

FIGS. 4A and 4B are diagrams showing illustrative public key cryptography (400) principles. According to certain illustrative embodiments, a key generator (402) may produce a public key (404) and a private key (406). The public key (404) may be associated with a virtual machine (410) that has been dispensed to a distributed computing system. Similarly, the private key (406) may be associated with the management appliance (414) which dispensed the virtual machine (410).

Public key cryptography (400) generally involves the generation of a private key (406) which remains secret and a public key (404) which is published. Data may be encrypted by an entity using a private key. The public key (404) and the private key (406) may be a mathematically related pair. The mathematical relation may allow data to be encrypted with a public key (404) in a manner such that the encrypted data is only able to be decrypted using the secret private key (406). Thus, it does not compromise the integrity of the system if anyone has access to the public key (404), as decrypting the encrypted data is impossible without the private key (404). A public key and a private key typically include random numbers. There are many ways to use those random numbers to encrypt data. A system or method embodying principles described herein may use any suitable encryption method and public/private key (404, 406) configuration.

According to certain illustrative embodiments, data (412) associated with a virtual machine (410) may be encrypted using a public key (404). The encrypted data may then be transmitted to the management appliance (414). The management appliance (414) may then use a private key (406) to decrypt the encrypted data (414). The decrypted data may contain information such as identifying information or other relevant data that may indicate a trusted relationship. The transfer of data from the management appliance (414) to the virtual machine (410) may occur in a similar manner.

In some embodiments, a public key (404) or private key (406) may be stored in a secure storage location. A secure storage location may be any memory media which a management appliance (414) or a virtual machine (410) may have secure access to. The secure storage location may or may not be part of a management appliance (414) system.

Figure 5:
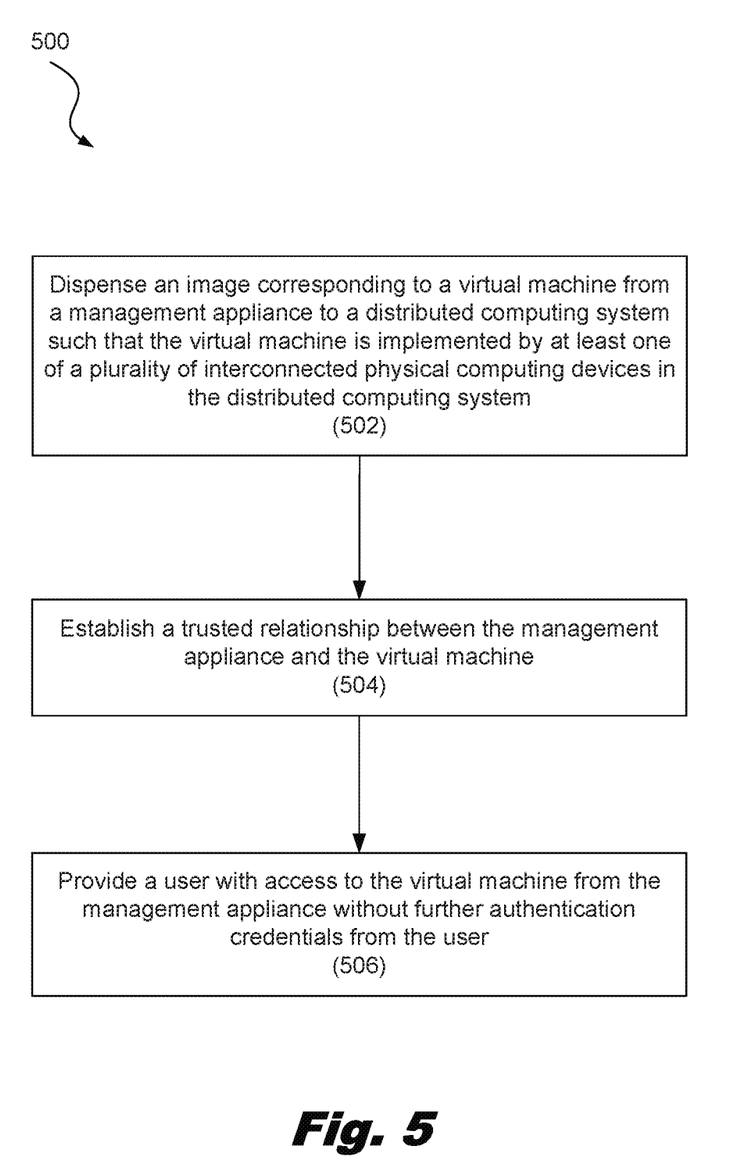
FIG. 5 is a flow chart showing an illustrative method for securely accessing a virtual machine from a management appliance, according to one embodiment of principles described herein.

FIG. 5 is a flow chart showing an illustrative method for securely accessing a virtual machine from a management appliance. According to certain illustrative embodiments, the method (500) includes dispensing (step 502) an image corresponding to a virtual machine from a management appliance to a distributed computing system such that the virtual machine is implemented by at least one of a plurality of interconnected physical computing devices in the distributed computing system; establishing (step 504) a trusted relationship between the management appliance and the virtual machine; and providing (step 506) a user with access to the virtual machine from the management appliance without further authentication credentials from the user.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for providing secure access to a virtual machine instance comprising:
    dispensing a virtual machine instance within a hypervisor from a remote server acting as a management appliance such that the virtual machine instance is implemented by at least one of a plurality of interconnected physical computing devices in a distributed computing system;
    filtering a request for access to the virtual machine instance based on access privileges of a user among a plurality of users accessing the remote server comprising restricting the user's access to the virtual machine instance based on credentials provided by the user upon accessing the remote server in response to a determination that the user has access to the remote server and not the virtual machine instance; and
    establishing a trusted relationship between the remote server and the virtual machine instance;
    wherein the trusted relationship is established through public-key cryptography, the method further comprising:
    associating a public key with the virtual machine instance;
    associating a private key with the remote server; and
    maintaining the private key in a secured storage location accessible to a processor of the remote server.

2. The method of claim 1, further comprising permitting user access to the virtual machine instance from the remote server based on the trusted relationship without further authentication credentials from the user.

3. The method of claim 1, wherein the trusted relationship is established based on criteria selected from the group consisting of establishing the trusted relationship upon the dispensing virtual machine instance from the remote server to the distributed computing system or establishing the trusted relationship in response to the user attempting to access the virtual machine instance.

4. The method of claim 1, further comprising setting the trusted relationship to expire after a predetermined amount of time.

5. The method of claim 1, further comprising assigning a different level of access to each of the plurality of users.

6. The method of claim 1, wherein the filtering comprises catching the request before the requests are processed through a transfer protocol.

7. A remote server comprising:
    at least one processor; and
    a memory communicatively coupled to the at least one processor, wherein the memory comprises executable code stored thereon such that the at least one processor, upon executing the executable code:
        dispenses virtual machine instance via a hypervisor to a distributed computing system comprising a plurality of interconnected computing devices, such that at least one of the computing devices implements the virtual machine instance;
        filters a request for access to the virtual machine instance based on access privileges of a user among a plurality of users accessing the remote server before the request is processed through a transfer protocol,
        wherein the filtering comprises, in response to a determination that the user has access to the remote server and not the virtual machine instance, restricting the user's access to the virtual machine instance based on credentials provided by the user upon accessing the remote server; and
        establishes a trusted relationship with the virtual machine instance implemented on the at least one of the computing devices;
    wherein the at least one processor establishes the trusted relationship through public-key cryptography comprising:
    associating a public key with the virtual machine instance, associating a private key with the remote server; and
    maintains the private key in a secured storage location.

8. The remote server of claim 7, wherein the at least one processor further
    provides a user with access to the virtual machine instance based on the trusted relationship without further authentication credentials from the user.

9. The remote server of claim 7, wherein said computer readable program code, when executed by a processor, assigns a different level of access to each of a plurality of users.

10. The remote server of claim 7, wherein the at least one processor establishes the trusted relationship upon dispensing the image corresponding to the virtual machine instance.

11. The remote server of claim 7, wherein the secure storage location is accessible by the remote server and the virtual machine instance.

12. A computer program product for providing secure access to a virtual machine instance on a distributed computing system, the computer program product comprising:
    a computer readable storage medium having computer readable code embodied therewith, the computer readable program code to, when executed by a processor:
        dispense a virtual machine instance within a hypervisor from a remote server to a computing device;
        establish a trusted relationship between the remote server and the virtual machine instance implemented on the computing device;
        provide a user with access to the virtual machine instance from remote server based on the trusted relationship without further authentication credentials from the user, wherein the trusted relationship is established with public-key cryptography, the computer readable program code further to, when executed by the processor:
            associate a public key with the virtual machine instance;
            associate a private key with the remote server; and
            maintain the private key in a secured storage location; and
        filter a request for access to the virtual machine instance based on access privileges of a user among a plurality of users accessing the remote server comprising restricting the user's access to the virtual machine instance based on credentials provided by the user upon accessing the remote server in response to a determination that the user has access to the remote server and not the virtual machine instance.

13. The computer program product of claim 12, wherein the computer readable program code, when executed by the processor, further:
    filters a request for access to the virtual machine instance based on the access privileges of the current user among a plurality of users accessing the remote server, wherein the filtering comprises, in response to a determination that the user among a plurality of users accessing the remote server has access to the remote server and not the virtual machine instance, restricting the user's access to the virtual machine instance based on credentials provided by the user upon accessing the remote server.

14. The computer program product of claim 12, wherein the computer readable program code, when executed by the processor, assigns a different level of access to each of the plurality of users.

15. The computer program product of claim 13, wherein the filtering comprises catching the request before the requests are processed through a transfer protocol.

16. The computer program product of claim 12, wherein the computer readable program code, when executed by the processor, establishes the trusted relationship through public-key cryptography comprising:
    associating a public key with the virtual machine instance,
    associating a private key with the remote server; and
    maintains the private key in a secured storage location.

17. The computer program product of claim 16, wherein the computer readable program code, when executed by the processor, maintains the private key in a secured storage location.

\* \* \* \* \*